No. 722,806. PATENTED MAR. 17, 1903.
W. H. BURCHER.
SHAFT SUPPORT FOR VEHICLES.
APPLICATION FILED SEPT. 22, 1902.
NO MODEL.
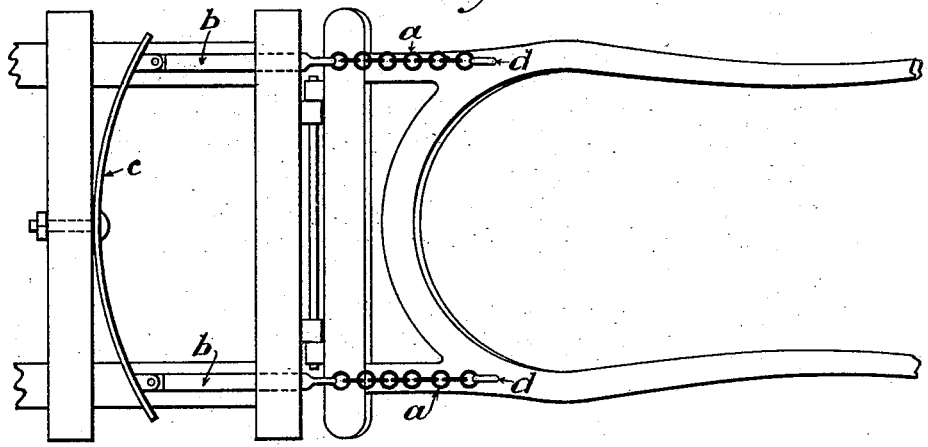
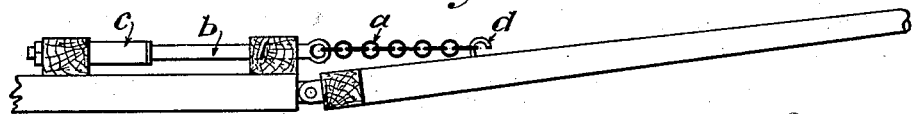
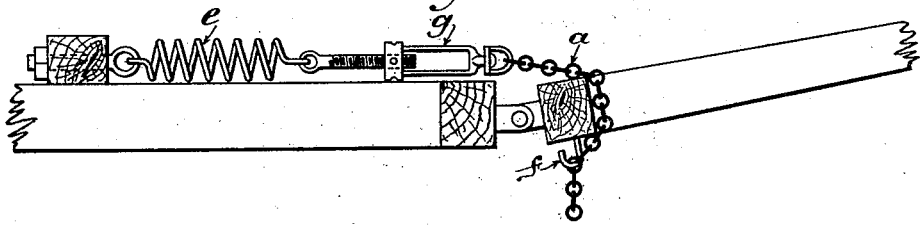
Witnesses:—
Benjamin Clark
Charles H. Briggs
Inventor:—
William Henry Burcher
per: E. Eaton.
His Attorney.

UNITED STATES PATENT OFFICE.

WILLIAM HENRY BURCHER, OF LONDON, ENGLAND.

SHAFT-SUPPORT FOR VEHICLES.

SPECIFICATION forming part of Letters Patent No. 722,806, dated March 17, 1903.

Application filed September 22, 1902. Serial No. 124,429. (No model.)

*To all whom it may concern:*

Be it known that I, WILLIAM HENRY BURCHER, a subject of the King of Great Britain, and a resident of Peckham, in the county of London, England, have invented certain new and useful Improvements in Means for Supporting Shafts of Vans and other Vehicles, (for which I have applied for a patent in Great Britain, No. 21,938, dated October 31, 1901,) of which the following is a full, clear, and exact specification.

This invention consists in improvements in means for supporting shafts of vans or other vehicles, the object being to relieve the horse of the weight thereof. To each side of the shafts I attach a chain or like connection, said chain or like connection being attached to a rod extending horizontally underneath the van or vehicle, the inner ends thereof engaging with a suitable spring, thus keeping said chain or connection taut and supporting the shafts.

Referring to the annexed drawings, Figure 1 is a plan view of my invention applied to the shaft of a vehicle; Fig. 2, side elevation of same; Fig. 3, side elevation of modified form.

The chains $a$ are attached to the rods $b$, $c$ being a spring to which the rods $b$ are attached, the chains $a$ being hooked to the shaft at $d$, as shown.

In the modified form, Fig. 3, I dispense with the rod $b$ and employ a spiral spring $e$, as shown, the chain $a$ being hooked to the center of the shaft, as shown at $f$, instead of at each side, as in Figs. 1 and 2. By this means it will be seen that the weight of the shafts is not carried by the horse or other animal, the angle of the shafts being varied as desired by the length of the chain $a$, and at the same time the motion of the animal, which would be imparted to the shafts, will be counteracted by the spring $c$ or $e$, $g$ being a screw and swivel-nut for adjusting the angle of the shafts when desired.

Having thus described my invention, what I claim, and desire to secure by Letters Patent, is—

In means for supporting the shafts of one-horse vehicles, a flat spring rigidly attached at the center thereof to the framing of the vehicle, a rod or bar pivotally connected to each end of said spring, a chain attached to the free end of each rod or bar, a hook attached to each shaft and with which the chains engage, all in combination, substantially as described and illustrated herein.

In testimony that I claim the foregoing I have hereunto set my hand this 27th day of August, 1902.

WILLIAM HENRY BURCHER.

Witnesses:
ARTHUR J. DRACKFORD,
HUGH HUGHES.